Jan. 9, 1945.  E. L. NOONAN ET AL  2,366,868
WING FLAP AND TAIL WHEEL CONTROL
Filed May 29, 1941  2 Sheets-Sheet 2

INVENTORS
EDMUND L. NOONAN AND
WALTER TYDON
BY
ATTORNEY

Patented Jan. 9, 1945

2,366,868

UNITED STATES PATENT OFFICE 2,366,868

REISSUED

WING FLAP AND TAIL WHEEL CONTROL

Edmund L. Noonan, Dayton, Ohio, and Walter Tydon, Kenmore, N. Y., assignors to Curtiss-Wright Corporation, a corporation of Delaware

SEP 18 1945

Application May 29, 1941, Serial No. 395,756

8 Claims. (Cl. 244—42)

This invention relates to landing devices for aircraft. An object of the invention is to provide means for locking a normally swiveling tail wheel against such swiveling during landing and take-off maneuvers of the aircraft to the end that ground looping tendencies may be suppressed.

It is well known that various forms of tail wheels or other tail landing units have been devised which are either fixed in a fore-and-aft position, which are steerable, or which are freely swiveling. The fixed landing unit is desirable during the actual maneuvers of take-off and landing for it tends to hold the aircraft in the path of movement. The fixed landing device, however, introduces difficulty when taxiing and parking an aircraft on the ground. Steerable tail wheels and swiveling tail wheels are desirable for ground manipulation but are not preferred for landing and take-off maneuvers. Some tail wheel assemblies have been provided with locking devices, operable from the ground, which may be set by the ground crew into the locking position as desired, but cockpit control should be available for such devices to give the aircraft pilot full flexibility of operation. Since modern aircraft are already equipped with a host of control devices for more essential aircraft functions, the addition of a tail wheel lock merely adds to the multiplicity and is thus undesirable. This invention contemplates the coordination of a tail wheel locking device with an existing more necessary landing control device to the end that no complication is added to the aircraft, but the added function of a selectively freely movable or locked tail wheel is given to the pilot at no cost in control complication. Many aircrafts are presently equipped with auxiliary aerodynamic landing devices, such as landing flaps. It is essential to have some mechanism by which the landing flaps may be lowered or raised back to their normal position. Thus, it is an object of this invention to coordinate a tail wheel lock with the operation of auxiliary landing devices such as flaps to the end that, when the flaps are in their normal position, the tail wheel is left free for swiveling or steering, while when the flaps are lowered, the tail wheel is locked in a fore-and-aft plane.

Further objects of the invention will become apparent in reading the description below in connection with the drawings, in which.

Figure 1:
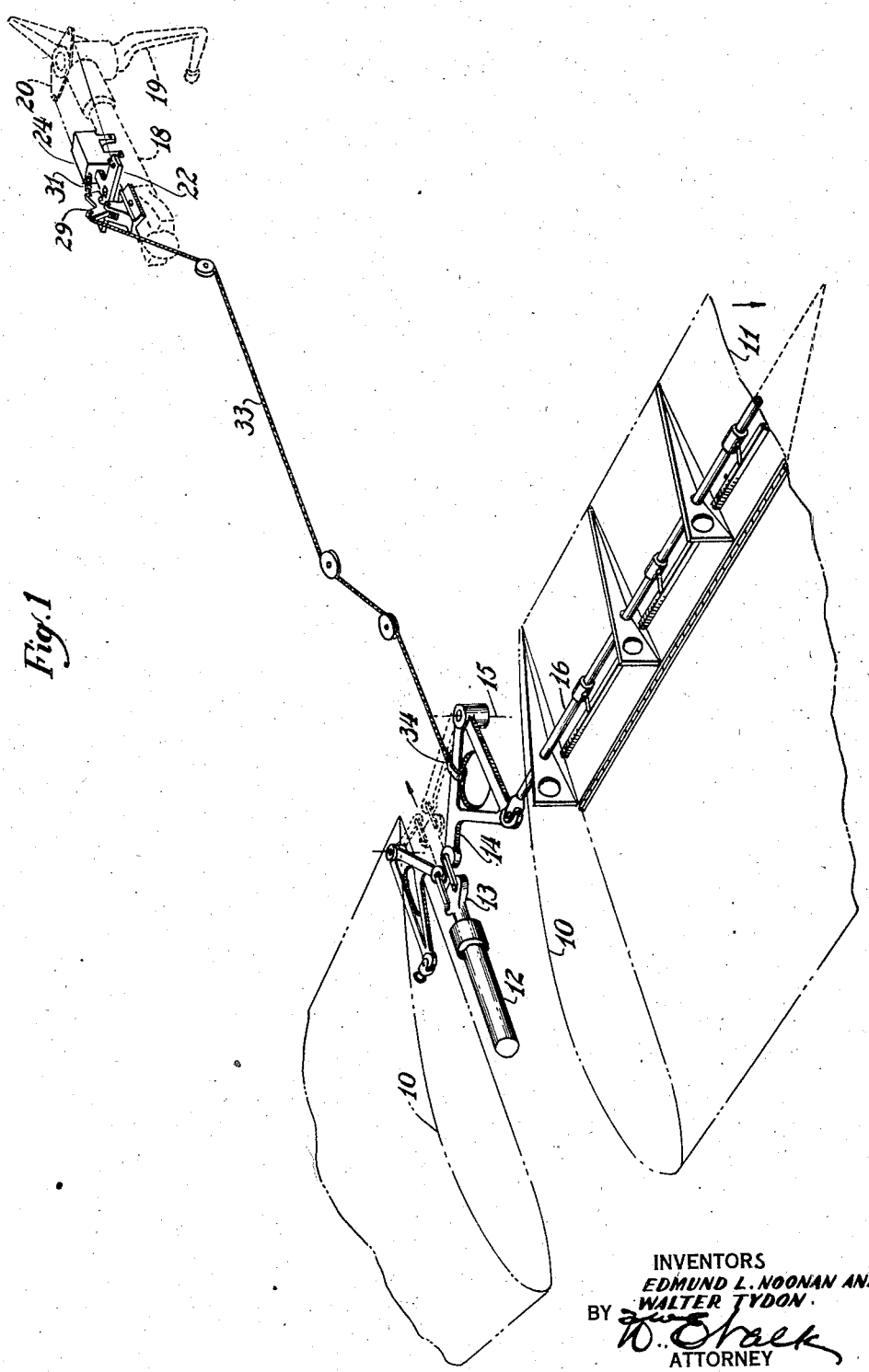
Fig. 1 is a perspective diagrammatic view of the invention.
Figure 2:
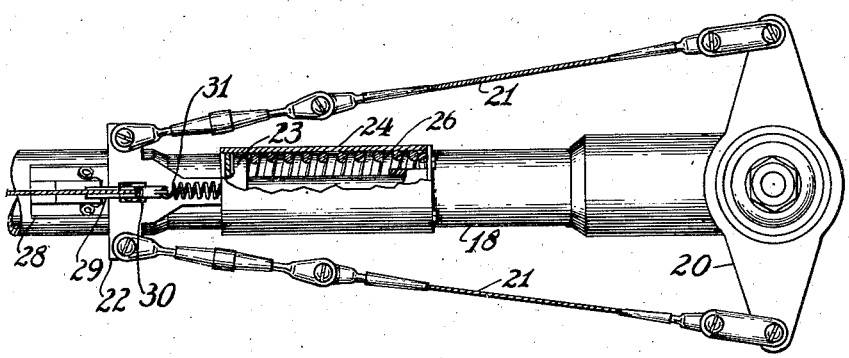
Figs. 2 and 3 are respectively a plan and side elevation of a tail wheel unit incorporating the invention.
Figure 3:
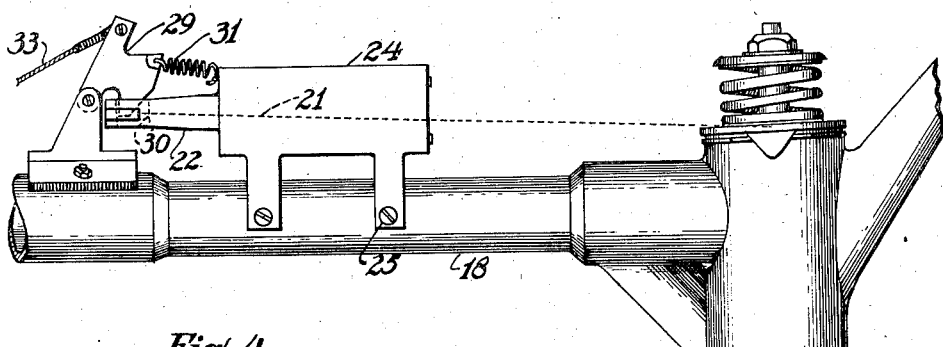
Figure 4:
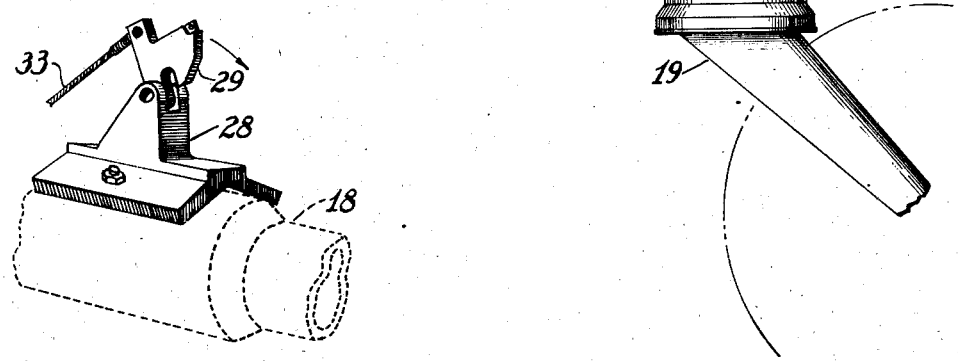
Fig. 4 is a perspective view of a portion of the tail wheel lock.

Fig. 1 shows wings 10 of an aircraft, the wings being provided with landing flaps 11, which may be lowered or returned to their normal position by the operation of a hydraulic motor cylinder 12 having a plunger 13 operably connected to bellcranks 14 pivoted at 15 to the wing structure and pivoted to a flap operating arm 16, which extends spanwise of the wing. The aircraft is also provided with a tail wheel support arm 18 in which a tail wheel carrying fork 19 is journalled on a vertical axis for swiveling movement. That portion of the fork 19 which extends above the support 18 is provided with a crossbar 20 to the ends of which cables 21 are clevised, these cables extending forwardly to a yoke 22 mounted on the end of a piston 23 which is slidable in a cylinder 24 secured as at 25 to the support 18. The cylinder 24 contains a compression spring 26 bearing upon the piston 23 and urging same in a forward direction, thus placing the cables 21 under tension and centralizing the tail wheel fork 19 in a fore-and-aft direction. It will be apparent that, when the aircraft is on the ground, the tail wheel is comparatively free to move from a fore-and-aft plane for steering and maneuvering purposes. If desired, the tail wheel fork may be provided with releasing means to permit full swiveling after the manner of Butler's teachings in Patent No. 2,114,522.

Forward of the cylinder 24 a bracket 28 is secured to the support 18 to which is pivoted a hook 29 which is movable into and out of engagement with an aperture 30 formed in the middle of the yoke 22. A spring 31 normally urges the hook into engagement with the yoke 22 and when so engaged, the yoke is constrained from rearward movement to the end that the tail wheel fork 19 is locked in a central position. The hook 29 is connected to a cable 33 which extends forwardly through the fuselage of the aircraft, not shown, to one of the bellcranks 14 of the flap lowering and restoring mechanism, as at 34.

It will thus be apparent that when the flaps 11 are in their normal position, the cable 33 is placed under tension and the hook 29 is withdrawn from the yoke 22 to allow of swiveling tail movement, which is desired during ground maneuvering and which is of no importance during normal flight. When the flaps 11 are lowered for a landing or take-off maneuver, the cable connection 34 moves rearwardly, relieving the tension in the cable 33 and permitting the spring 31 to effect engagement of the hook 29 with the yoke 22. Thus, so long as the landing flaps are lowered, the tail wheel is locked. In normal operation, after the landing is completed, the landing flaps 11 would be in their normal position, thus freeing the tail wheel for swiveling during ground handling of the aircraft.

Although the tail wheel assembly as shown does not have steerability, it is feasible to continue the cables 21 forwardly to the pilot's cockpit with slight modifications in the rigging of the yoke 22 whereby, when the locking hook 29 is disengaged from the yoke, the steering of the aircraft during ground maneuvering may be accomplished by the pilot.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an aircraft, adjustably supported wing lift-increasing means, a tail landing device normally capable of swiveling, means operable to adjust said lift-increasing means, locking means operable to prevent or permit swiveling of said tail device, and means connected to said locking means and responsive to adjustment of said first mentioned means to a lift-increasing position for locking said tail device against swiveling.

2. In an aircraft, adjustably supported wing lift-increasing means, a landing tail wheel normally capable of swiveling, means connected to said lift-increasing means for adjustment thereof, locking means operable to prevent or permit swiveling of said tail wheel, and means interconnecting said locking means with said lift-increasing operating means for locking said tail wheel against swiveling when said first-mentioned means is adjusted to a lift-increasing position.

3. In an aircraft, adjustably supported wing flaps, a landing tail wheel normally capable of swiveling, means operable to lower said flaps, locking means operable to prevent or permit swiveling of said tail wheel, and means connected to said locking means and responsive to lowering of said flaps for locking said tail wheel against swiveling when said flaps are lowered.

4. In an aircraft, adjustably supported wing flaps, a landing tail wheel normally capable of swiveling, means operable to adjust said flaps, a lock operable to prevent or permit swiveling of said tail wheel, and means interconnecting said lock with said flap adjusting means for locking said tail wheel against swiveling when said flaps are lowered.

5. In an aircraft, adjustably supported wing flaps, a landing tail wheel normally capable of swiveling, means operable to adjust said flaps, a lock operable to prevent or permit swiveling of said tail wheel, and means interconnecting said lock with said flap adjusting means for locking said tail wheel against swiveling when said flaps are lowered and for freeing said tail wheel when said flaps are raised from said lowered position.

6. In an aircraft, adjustably supported wing flaps, means operable to adjust said flaps, a landing tail wheel normally capable of swiveling, means for resiliently centralizing said tail wheel in a fore-and-aft direction, locking means engageable with said centralizing means for locking said tail wheel in a fore-and-aft direction, and means connected to said locking means and responsive to lowering of said flaps for effecting engagement of said locking means with said centralizing means.

7. In an aircraft, adjustably supported wing flaps, means operable to adjust said flaps, a tail wheel assembly comprising a wheel-carrying member, a support to which said member is journaled, a crossbar carried by said member transversely of the direction of the journal axis, a movable element, a flexible connection from each end of said crossbar to said element, and spring means operable to urge said element in a direction to tension said connections for resiliently centralizing said tail wheel in a fore-and-aft direction, a locking member carried by said support and engageable with said element to prevent movement thereof for locking said tail wheel in a fore-and-aft direction, and means connected to said locking member and responsive to lowering of said flaps for effecting engagement of said locking member with said element.

8. In an aircraft, an adjustable airfoil, means operable to adjust said airfoil, a landing tail wheel normally capable of swiveling, locking means operable to prevent or permit swiveling of said tail wheel, and means connected to said locking means and responsive to adjustment of said airfoil for locking said tail wheel against swiveling.

EDMUND L. NOONAN.
WALTER TYDON.